United States Patent [19]
Puttner et al.

[11] 3,890,385
[45] June 17, 1975

[54] DICHLOROBENZALDEHYDE-OXIME-CARBONATES

[75] Inventors: Reinhold Puttner; Friedrich Arndt, both of Berlin, Germany

[73] Assignee: Schering AG, Berlin, Germany

[22] Filed: June 28, 1973

[21] Appl. No.: 374,496

[30] Foreign Application Priority Data
July 13, 1972  Germany............................ 2234816

[52] U.S. Cl............................. 260/566 AE; 71/121
[51] Int. Cl........................................... C07c 131/00
[58] Field of Search................................ 260/566 AE

[56] References Cited
UNITED STATES PATENTS

| | | | |
|---|---|---|---|
| 3,165,392 | 1/1965 | Koopman | 260/566 AE |
| 3,644,524 | 2/1972 | Cahoy | 260/566 AE |
| 3,732,306 | 5/1973 | Cutman et al. | 260/566 AE |

*Primary Examiner*—Gerald A. Schwartz
*Attorney, Agent, or Firm*—Joseph F. Padlon

[57] ABSTRACT

Dichlorobenzaldehyde-oxime-carbonates are prepared, and used per se or as active ingredients in herbicide compositions.

5 Claims, No Drawings

DICHLOROBENZALDEHYDE-OXIME-CARBONATES

The invention refers to new 2,6-dichlorobenzaldehyde-oximecarbonates, methods for their production, and to herbicides containing these compounds as active ingredients.

Until now, few compounds have become known which are suitable for the inhibiting or controlling the growth of plants for the purpose of combating undesirable plant growth. Among these so-called inhibitors it should be noted 2,6-dichlorobenzonitrile, U.S. Pat. No. 3,027,248, which, however, does not always satisfy the requirements for the practice of effectively inhibiting or controlling plant growth.

Another growth inhibitor known in the art is maleic acid hydrazide (1,2-dihydropyridazine-3-6-dione), an active substance which is known to inhibit especially grasses in their growth, of German Patent No. 815,192. As a disadvantage in the use of this compound, it has been found, however, that in the comparatively low quantities applied, the effect is insufficient.

It is, therefore, essentially an object of the present invention to develop a more effective agent in comparison with the known inhibitors.

It has now been found that compounds of the general formula:

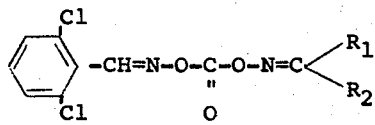 (I)

in which $R_1$ and $R_2$ are identical or different, and represent, respectively, a mono- or multi-substituted aromatic, aliphatic, cycloaliphatic or araliphatic hydrocarbon radical or in which $R_1$ and $R_2$ together with the carbon atom represent a mono- or multisubstituted cycloaliphatic hydrocarbon radical, are herbicidal and show a better effect on undesired plant growth than presently known agents.

In this connection there enter into consideration for $R_1$ and $R_2$, as aromatic hydrocarbon radicals such as the phenyl or the naphthyl radical; as aliphatic hydrocarbon radicals, such as those with 1 to 12 carbon atoms; namely, methyl, ethyl, propyl, isopropyl, butyl and others; as cycloaliphatic hydrocarbon radicals those with 5 to 8 carbon atoms, such as cyclohexyl and others, and as araliphatic hydrocarbon radicals, as benzyl or phenylethyl and others, these radicals being, for example, identically or differently substituted by the low alkyl radicals, such as, methyl or ethyl; halogen atoms, such as chlorine or bromine; low alkoxy radicals; such as methoxy or ethoxy and others.

$R_1$ and $R_2$ in the formula may also form a cycloaliphatic 5- to 8-membered ring; for example, cyclohexyl or cyclooctyl and others, which may be mono- or multisubstituted by the low alkyl radicals, as methyl, etc.

The compounds according to the invention show above all a strong, inhibiting effect on growing meristematic tissue, such as the vegetation points and root tips. They also prevent germination and growth of seedlings and thus combat growth of mono- and dicotyledonous plant species. Such species are *Stellaria media, Senecio vulgaris, Matricaria chamomilla, Lamium amplexicaule, Centaurea cyanus, Amaranthus retroflexus, Galium aparine, Chrysanthemum segetum, Avena fatua, Alopecurus myosuroides, Echinochloa crus galli, Setaria italica, Agropyron repens, Cynodon dactylon, Cyperus esculentus, Cyperus rotundus, Sorghum halepense, Ipomea purpurea, Polygonum lapathifolium, Digitaria sanguinalis, Lolium perenne, Setaria faberii, Rumex crispus, Taraxacum officinale* and *Artemisia vulgaris*.

It has also been found that by using the compounds according to the invention the growth of the sprout of persistent weeds is suppressed if the treatment occurs before or at budding. In this way, for example, it is possible to combat *Agropyron repens, Artemisia vulgaris, Rumex crispus, Taraxacum officinale, Cynodon dactylon, Sorghum halepense, Cyperus esculentus, Cyperus rotundus, Pteridium aquilinum* and *Equisetum ssp*. This effectiveness signifies a substantial technical improvement particularly since if the compound is not used the named weeds have proliferated to such an extent in some areas they make the profitable utilization of the tilled field questionable.

Another major advantage in the use of the compounds according to the invention is their particular compatibility with crop plants, which are not impaired by the treatment. For example, weeds in orchards, berries, ornamental trees, plants and shrubs and in planted rice can be combated without damage to their cultivation.

For the described purposes there are suitable among the compounds according to the invention particularly those where in the defined general formula the radicals $R_1$ and $R_2$ are identical and represent an alkyl radical with 1 to 3 carbon atoms, such as methyl, ethyl or propyl, or the phenyl radical.

The quantities used in application are, depending on area of use and type of plant, between about 1 and 5 kg active substance per hectare. For total weed control and also for the control of aquatic plants, higher quantities to about 10 kg of active substance per hectare or in special cases even more can advantageously be used.

The compounds according to the invention can be used either alone or in mixtures with one another, and also in mixtures with other plant protection and pest control agents. If an additional widening of the spectrum of action is intended, other herbicides also may, for example be added, whereby synergistic effects may be expected.

Depending on the purpose of use, other substances also may be added. Such substances are non-phytotoxic additions which may result in producing synergistic effects with herbicides. They are wetting agents, emulsifiers, solvents, oily additions and others.

Advantageously, the active substances according to invention or their mixtures are used in preparations, such as powders, scatters, granulations, solutions, emulsions or suspensions, with the addition of liquid and/or solid vehicles or diluents and possibly wetting adhesive, emulsifying and/or dispersing aids.

suitable liquid vehicles such as water, aliphatic and aromatic hydrocarbons, like benzene, toluene, cyclohexanone, isophorone, as mineral oil fractions may be used.

Suitable solid vehicles that may be used are mineral earths such as siliceous clay, silica gel, talc, kaolin, attaclay, limestone, silica and plant products, such as flours.

Among the surface-active substances that may be used are: calcium lignin sulfonate, polyoxyethyleneoctylphenol ether, naphthalene sulfonic acids, phenol sulfonic acids, formaldehyde condensates, fatty alcohol sulfates and fatty acid alkali and alkaline earth salts.

The proportion of the active substance or substances in the various preparations may vary within wide limits. For example, the agents contain about 20 to 80 percent by weight of active substances, about 80 to 20 percent by weight of liquid or solid vehicles and possibly up to 20 percent by weight of surface-active substances.

The agents can be applied in the usual manner. For example, with water as the vehicle in spray solution, quantities of 100 to 1000 liters per hectare may be used. For total weed control, also the partly common quantities of more than 1000 liter/ha may be readily applied. Also, the use of the agents in the socalled "Ultra-low-volume process" is possible. Likewise, the agents may be used in microgranulate form.

The use is also carried out by spraying or scattering the agents ready for use on the still weed-free ground. By working the agents into the ground, their effectiveness is, as a rule, increased.

The identified new compounds are produced for example, by reacting 2,6-dichloro-benzaldehyde oxime of the formula

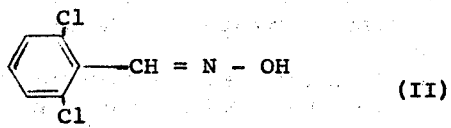

(II)

or the alkali salt thereof, such as the sodium or potassium salt, with a compound of the general formula

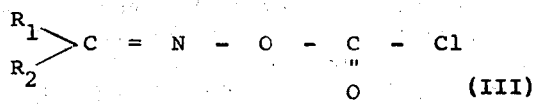

(III)

with the use of an inert organic solvent, like chloroform, methylene chloride or diethyl ether, and preferably in the presence of an acid acceptor, such as a tertiary organic base, like triethylamine, $R_1$ and $R_2$ having the above named meaning in formula I.

The following examples illustrate the production of the compounds according to the invention.

1. Isopropylidenamino-(2,6-dichlorobenzylidenamino)-carbonate

To a solution of 19 g (0.1 mole) 2,6-dichlorobenzaldehyde oxime and 10.1 g (0.1 mole) triethylamine in 200 ml chloroform a solution of 13.55 g (0.1 mole) 2-oximino-propane-0-carboxylic acid chloride in 50 ml of chloroform is added drop by drop with intense agitation at —10° to —5° C. After this, the reaction mixture is left standing for one hour at 0° C. The reaction mixture is then poured into iced water and the organic phase washed with iced water three times. The product is dried with magnesium sulfate and evaporated under reduced pressure. The residue is treated with methanol.

Yield: 20.2 g = 70% of the theory
M.P. 83° – 86° C 1 a. This compound can also be produced as follows:
To a suspension of 4.24 g (0.02 mole) 2,6-dichlorobenzaldehyde-oxime sodium in 100 ml methylene chloride there is added while stirring intensively at —15°, a solution of 2.71 g (0.02 mole) 2-oximino-propane-0-carboxylic acid chloride in 50 ml methylene chloride drop by drop. This is stirred for 3 hours at —5° to 0° C. The reaction mixture is filtered and the methylene chloride removed under vacuum. The colorless residue is recrystallized from methanol.

Yield: 3.7 g = 64% of the theory

2. Diphenylmethylenamino-(2,6-dichlorobenzylidenamino)-carbonate

To a suspension of 19 g (0.1 mole) 2,6-dichlorobenzaldehyde-oxime in 200 ml chloroform there are added simultaneously drop by drop while stirring intensively at —15° C to —10° C a solution of 25.97 g (0.1 mole) benzophenone-oxime-0-carboxylic acid chloride in 70 ml chloroform and a solution of 10.1 g (0.1 mole) triethylamine in 50 ml chloroform. Thereafter the reaction mixture is left standing for one hour at 0° C. The reaction mixture is poured into iced water and the organic phase washed three times with iced water. The product is dried with magnesium sulfate and evaporated under reduced pressure. The residue is then treated with methanol.

Yield: 28.2 g = 68% of the theory
M.P. 92° – 101° C

By this process, it is also possible to produce for example 1-phenylethylidene-amino-(2,6-dichlorobenzylidene-amino)-carbonate of the M.P. 107°–110° C.

The compounds according to invention are practically colorless and odorless, usually crystalline substances. They are insoluble in water and gasoline and slightly soluble in acetone, tetrahydrofurane, cyclohexanone, isophorone and dimethyl formamide.

The starting products for the production of the compounds according to the invention are known or can be produced by known methods.

The production of the preparations of the compounds according to the invention and of their mixtures, ready for use, can be carried out in a known manner, such as by mixing or grinding. If desired, the individual components may be mixed only just before their use, as is done in the practice for example, in the so-called tank mix process.

The following examples will show the herbicidal effect of the compounds according to invention.

EXAMPLE 1

The compounds listed in the table were sprayed on virgin soil in the greenhouse at a dose of 3 kg active substance per hectare and then worked into the soil. The compounds were present as aqueous suspensions, which were applied at 500 liters per hectare. Then the plants listed in the following table were sown.

The rating was effected 3 weeks after the treatment by determining the degree of damage of the plants, using the rating code 0 – 10 with 0 = "totally destroyed or inhibited" and 10 = "not damaged."

The findings show the superior effect of the agents to be used according to the invention.

|  | Compounds according to invention | | | Comparison agent | Untreated Control |
|---|---|---|---|---|---|
|  | A | B | C | D |  |
| Cauliflower | 0 | 0 | 0 | 1 | 10 |
| Sugar beet | 0 | 0 | 0 | 3 | 10 |
| Tomato | 0 | 0 | 0 | 2 | 10 |
| Carrot | 0 | 0 | 0 | 5 | 10 |
| Onion | 0 | 0 | 0 | 4 | 10 |

-Continued

| | Compounds according to invention | | | Comparison agent | Untreated Control |
|---|---|---|---|---|---|
| | A | B | C | D | |
| Cucumber | 0 | 0 | 0 | 5 | 10 |
| Alfalfa | 0 | 0 | 0 | 2 | 10 |
| Spinach | 0 | 0 | 0 | 5 | 10 |
| Bush bean | 0 | 0 | 0 | 1 | 10 |
| Cotton | 0 | 0 | 0 | 5 | 10 |
| Soy bean | 0 | 0 | 0 | 5 | 10 |
| Sunflower | 0 | 0 | 0 | 1 | 10 |
| Potato | 0 | 0 | 0 | 0 | 10 |
| Corn | 0 | 0 | 0 | 5 | 10 |
| Wheat | 0 | 0 | 0 | 5 | 10 |
| Barley | 0 | 0 | 0 | 10 | 10 |
| Rye | 0 | 0 | 0 | 5 | 10 |
| Oat | 0 | 0 | 0 | 5 | 10 |
| Rice | 0 | 0 | 0 | 5 | 10 |
| Marrow-stem kale | 0 | 0 | 0 | 1 | 10 |
| Winter rape | 0 | 0 | 0 | — | 10 |
| Pea | 0 | 0 | 0 | 1 | 10 |
| Seed sorghum | 0 | 0 | 0 | 2 | 10 |
| *Stellari media* | 0 | 0 | 0 | 10 | 10 |
| *Senecio vulgaris* | 0 | 0 | 0 | 8 | 10 |
| *Matricaria chamomilla* | 0 | 0 | 0 | 5 | 10 |
| *Lamium amplexicaule* | 0 | 0 | 0 | 1 | 10 |
| *Centaurea cyanus* | 0 | 0 | 0 | 2 | 10 |
| *Amaranthus retroflexus* | 0 | 0 | 0 | 3 | 10 |
| *Galium aparine* | 0 | 0 | 0 | — | 10 |
| *Chrysanthemum segetum* | 0 | 0 | 0 | 2 | 10 |
| *Avena fatua* | 0 | 0 | 0 | 3 | 10 |
| *Alopecurus myosuroides* | 0 | 0 | 0 | 3 | 10 |
| *Echinochloa crus galli* | 0 | 0 | 0 | 3 | 10 |
| *Setaria italica* | 0 | 0 | 0 | 3 | 10 |
| *Cyperus esculentus* | 0 | 0 | 0 | 10 | 10 |
| *Ipomea purpurea* | 0 | 0 | 0 | 2 | 10 |
| *Polygonum lapathiofolium* | 0 | 0 | 0 | 8 | 10 |
| *Digitaria sanguinalis* | 0 | 0 | 0 | 3 | 10 |
| *Setaria faberii* | 0 | 0 | 0 | 8 | 10 |

A = Diphenlymethyleneamino-(2,6-dichlorobenzylideneamino)-carbonate
B = Isopropylideneamino-(2,6-dichlorobenzylideneamino)-carbonate
C = 1-phenylethylideneamino-(2,6-dichlorobenzylideneamino)-carbonate
D = Maleic acid hydrazide
0 = totally destroyed or inhibited
10 = not damaged

EXAMPLE 2

The compounds listed in the following table were sprayed in the greenhouse in a dose of 3 kg active substance per hectare before the sprouting of the plants. The agents were applied as an aqueous suspension in 500 liters per hectare. The rating was effected 4 weeks after the treatment by determining the degree of damage of the plants, using the rating code 0–10 with 0 = "totally destroyed or inhibited" and 10 = "not damaged."

The test values show the better inhibition of the sprouting of the plants when using the agents according to the invention.

| Compound according to invention | A | B | C | D | E | F | G | H | I | J |
|---|---|---|---|---|---|---|---|---|---|---|
| Isopropylideneamino-(2,6-dichlorobenzylideneamino)-carbonate | 1 | 0 | 0 | 0 | 0 | 0 | 0 | 0 | 0 | 0 |
| Comparison agent | | | | | | | | | | |
| 2,6-dichlorobenzonitrile | 0.5 | 0 | 1 | 0 | 2 | 3 | 0 | 0 | 0 | 3 |
| Untreated | 10 | 10 | 10 | 10 | 10 | 10 | 10 | 10 | 10 | 10 |

A = *Rumex crispus*
B = *Taraxacum officinale*
C = *artemisia vulgaris*
D = *Daucus carota*
E = *Vicia cracca*
F = *Rubus caesius*
G = *Poa pratensis*
H = *Festuca Rubra*
I = *Bromus ssp.*
J = *Agropyron repens*
0 = Totally destroyed or inhibited
10 = not damaged

EXAMPLE 3

In a test experiment, dry filter paper was sprayed with the compounds named below in quantities corresponding to a rate of 0.04, 0.02, 0.01 and 0.005 kg of active substance per hectare in the form of an aqueous suspension at 500 liters per hectare.

One, three and six days, respectively, after the treatment, 125 seeds of meadow grass per test section were placed on the paper and caused to germinate by wetting with water.

| Compound according to invention | A | B | C | D | E | F | G | H | I | J | K |
|---|---|---|---|---|---|---|---|---|---|---|---|
| Isopropylideneamino-(2,6-dichlorobenzylideneamino-carbonate | 10 | 10 | 10 | 10 | 10 | 10 | 10 | 10 | 10 | 10 | 10 |
| Comparison agent | A | B | C | D | E | F | G | H | I | J | K |
| 2,6-dichlorobenzonitrile | 6* | 3* | 5 | 4 | 5 | 4 | 10 | 5 | 0 | 3 | 5 |
| Untreated | 10 | 10 | 10 | 10 | 10 | 10 | 10 | 10 | 10 | 10 | 10 |

A = Apple seedling
B = 2-year vine
C = cauliflower
D = Alfalfa
E = Bush bean
F = Cotton
G = Peanut
H = Sunflower
I = Potato
J = Marrow-stem kale
K = Pea
0 = Totally destroyed or inhibited
10 = not damaged
* = Shoot damage

We claim:
1. Compounds of the general formula:

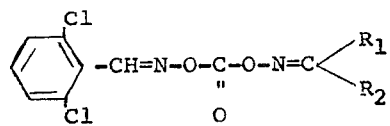

wherein $R_1$ and $R_2$ are individually selected from the group consisting of an alkyl radical having from 1 to 12 carbon atoms, a cycloalkyl radical having from 5 to 8 carbon atoms, a lower alkoxy radical, a phenyl radical, a naphthyl radical a benzyl radical, a phenylethyl radical, and when taken togeather $R_1$ and $R_2$ form a cycloalkyl radical having from 5 to 8 carbon atoms.

2. Compounds according to claim 1, where $R_1$ and $R_2$ are identical and represent an alkyl radical with 1 to 3 carbon atoms or a phenyl radical.

3. A compound of the formula set forth in claim 1 which is Isopropylideneamino-(2,6-dichlorobenzylideneamino)-carbonate.

4. A compound of the formula set forth in claim 1 which is Diphenylmethyleneamino-(2,6-dichlorobenzylideneamino)-carbonate.

5. A compound of the formula set forth in claim 1 which is 1-(Phenylethylideneamino-(2,6-dichlorobenzylidene-amino)-carbonate.

* * * * *